United States Patent
Shi

(10) Patent No.: US 11,395,350 B2
(45) Date of Patent: Jul. 19, 2022

(54) RANDOM ACCESS METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Cong Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/409,658

(22) Filed: Aug. 23, 2021

(65) Prior Publication Data

US 2021/0385881 A1 Dec. 9, 2021

Related U.S. Application Data

(63) Continuation of application No. PCT/CN2019/096862, filed on Jul. 19, 2019.

(51) Int. Cl.
*H04W 74/08* (2009.01)
*H04L 1/16* (2006.01)

(52) U.S. Cl.
CPC ....... *H04W 74/0841* (2013.01); *H04L 1/1614* (2013.01); *H04W 74/0816* (2013.01)

(58) Field of Classification Search
CPC .......... H04W 74/0841; H04W 74/0816; H04L 1/1614
See application file for complete search history.

(56) References Cited

U.S. PATENT DOCUMENTS

| 2018/0241511 | A1* | 8/2018 | Harada | ............ H04W 74/0833 |
|---|---|---|---|---|
| 2019/0037607 | A1 | 1/2019 | Ahn et al. | |
| 2019/0132764 | A1* | 5/2019 | Nam | ................. H04W 28/0263 |
| 2019/0223255 | A1 | 7/2019 | Jeon et al. | |
| 2019/0281636 | A1* | 9/2019 | Liu | .................... H04W 72/0446 |
| 2020/0077444 | A1* | 3/2020 | Liu | .................... H04W 74/0833 |
| 2020/0077447 | A1* | 3/2020 | Yang | ................. H04W 74/0833 |
| 2020/0314815 | A1* | 10/2020 | Kim | ..................... H04L 1/1854 |

(Continued)

FOREIGN PATENT DOCUMENTS

| CN | 106060937 A | 10/2016 |
|---|---|---|
| CN | 107006026 A | 8/2017 |

(Continued)

OTHER PUBLICATIONS

3GPP TSG-RAN2 106—R2-1905708—Reno, USA, May 13-May 17, 2019—Samsung—Random Access Response Reception in NR-U (4 pages).

(Continued)

*Primary Examiner* — Ivan O Latorre
(74) *Attorney, Agent, or Firm* — Perkins Coie LLP

(57) ABSTRACT

Provided in implementations of the present application are a wireless communication method, a terminal device, and a network device, which may achieve random access on NR unlicensed frequency bands. The wireless communication method comprises: a terminal device sends a first message during random access to a network device on an uplink licensed carrier or an uplink unlicensed carrier, the first message comprising a random access preamble; and the terminal device uses a first RAR format to detect a first RAR for the first message, the first RAR format targeting the unlicensed carrier.

8 Claims, 9 Drawing Sheets

(56) References Cited

U.S. PATENT DOCUMENTS

| | | | |
|---|---|---|---|
| 2020/0322894 A1* | 10/2020 | Xu | H04L 5/0091 |
| 2020/0404712 A1* | 12/2020 | Christoffersson | H04W 74/0833 |
| 2021/0007145 A1* | 1/2021 | Chen | H04L 5/00 |
| 2021/0007146 A1* | 1/2021 | Agiwal | H04W 76/11 |
| 2021/0136834 A1* | 5/2021 | Xu | H04W 74/008 |
| 2021/0176781 A1* | 6/2021 | Wang | H04W 80/02 |

FOREIGN PATENT DOCUMENTS

| | | |
|---|---|---|
| CN | 107079501 A | 8/2017 |
| CN | 108617001 A | 10/2018 |
| EP | 3466036 A1 | 4/2019 |

OTHER PUBLICATIONS

3GPP TS 38.212 V16.3.0 (Sep. 2020)—3rd Generation Partnership Project; Technical Specification Group Radio Access Network; NR; Multiplexing and channel coding (Release 16) (152 pages).

3GPP TS 38.213 V16.2.0 (Jun. 2020)—3rd Generation Partnership Project; Technical Specification Group Radio Access Network; NR; Physical layer procedures for control (Release 16) (176 pages).

3GPP TS 37.213 V16.3.0 (Sep. 2020)—3rd Generation Partnership Project; Technical Specification Group Radio Access Network; Physical layer procedures for shared spectrum channel access (Release 16) (26 pages).

International Search Report dated Apr. 22, 2020 of PCT/CN2019/096862 (5 pages).

Extended European Search Report for European Application No. 19938222.7 dated Feb. 18, 2022. 9 pages.

LG Electronics Inc. "MAC Random Access Response Extension" R2-084177; 3GPP TSG-RAN WG2 #63; Jeju, Korea; Aug. 18-22, 2008. 3 pages.

Examination Report for Indian Application No. 202117038277 dated Mar. 14, 2022. 9 pages with English translation.

* cited by examiner

RANDOM ACCESS METHOD, TERMINAL DEVICE, AND NETWORK DEVICE

CROSS-REFERENCE TO RELATED APPLICATIONS

The present application is a continuation application of International PCT Application No. PCT/CN2019/096862, having an international filing date of Jul. 19, 2019. The content of the above-identified application is hereby incorporated by reference.

TECHNICAL FIELD

Implementations of the present application relate to the field of communication, and more particularly, to a wireless communication method, a terminal device, and a network device.

BACKGROUND

A New Radio (NR) system may be applied to an unlicensed frequency band. Meanwhile, random access on an NR unlicensed frequency band needs to consider a factor such as Listen Before Talk (LBT). Therefore, a random access mode on an NR licensed frequency band cannot meet requirement of random access on a NR unlicensed frequency band. How to implement random access on an NR unlicensed frequency band, is an urgent problem to be solved.

SUMMARY

Implementations of the present application provide a wireless communication method, a terminal device, and a network device, which may implement random access on an NR unlicensed frequency band.

In a first aspect, there is provided a wireless communication method including: sending, by a terminal device, a first message in a random access procedure to a network device on an uplink licensed carrier or an uplink unlicensed carrier, the first message including a random access preamble; and detecting, by the terminal device, a first Random Access Response (RAR) for the first message by using a first RAR format, the first RAR format being for an unlicensed carrier.

In a second aspect, there is provided a wireless communication method including: sending, by a terminal device, a first message in a random access procedure to a network device, the first message including a random access preamble; and detecting, by the terminal device, a first RAR for the first message using a first RAR format or a second RAR format according to a type of an uplink carrier sending the first message, the first RAR format being different from the second RAR format.

In a third aspect, there is provided a wireless communication method including: receiving, by a network device, a first message in a random access procedure sent by a terminal device on an uplink licensed carrier or an uplink unlicensed carrier, the first message including a random access preamble; and sending, by the network device, a first RAR for the first message by using a first RAR format, the first RAR format being for an unlicensed carrier.

In a fourth aspect, there is provided a wireless communication method including: receiving, by a network device, a first message in a random access procedure sent by a terminal device, the first message including a random access preamble; and sending, by the network device, a first RAR for the first message by using a first RAR format or a second RAR format according to a type of an uplink carrier receiving the first message, the first RAR format being different from the second RAR format.

In a fifth aspect, there is provided a terminal device configured to perform the method according to the first aspect described above or various implementations thereof.

Specifically, the terminal device includes function modules for performing the method according to the first aspect described above or various implementations thereof.

In a sixth aspect, there is provided a terminal device configured to perform the method according to the second aspect described above or various implementations thereof.

Specifically, the terminal device includes function modules for performing the method according to the second aspect described above or various implementations thereof.

In a seventh aspect, there is provided a network device configured to perform the method according to the third aspect described above or various implementations thereof.

Specifically, the network device includes functional modules for performing the method according to the third aspect described above or various implementations thereof.

In an eighth aspect, there is provided a network device configured to perform the method according to the fourth aspect described above or various implementations thereof.

Specifically, the network device includes functional modules for performing the method according to the fourth aspect described above or various implementations thereof.

In a ninth aspect, there is provided a terminal device including a processor and a memory. The memory is configured to store a computer program, and the processor is configured to invoke and run the computer program stored in the memory to perform the method according to the first aspect described above or various implementations thereof.

In a tenth aspect, there is provided a terminal device including a processor and a memory. The memory is configured to store a computer program, and the processor is configured to invoke and run the computer program stored in the memory to perform the method according to the second aspect described above or various implementations thereof.

In an eleventh aspect, there is provided a network device including a processor and a memory. The memory is configured to store a computer program, and the processor is configured to invoke and run the computer program stored in the memory to perform the method according to the third aspect described above or various implementations thereof.

In a twelfth aspect, there is provided a network device including a processor and a memory. The memory is configured to store a computer program, and the processor is configured to invoke and run the computer program stored in the memory to perform the method according to the fourth aspect described above or various implementations thereof.

In a thirteenth aspect, there is provided an apparatus configured to implement the methods according to any one of the first to fourth aspects described above or various implementations thereof.

Specifically, the apparatus includes a processor configured to invoke and run a computer program from a memory, enabling a device having the apparatus installed thereon to perform the methods according to any one of the first to fourth aspects described above or various implementations thereof.

In a fourteenth aspect, there is provided a computer readable storage medium for storing a computer program that enables a computer to perform the methods according to any one of the first to fourth aspects described above or various implementations thereof.

In a fifteenth aspect, there is provided a computer program product including computer program instructions that enable a computer to perform the methods according to any one of the first to fourth aspects described above or various implementations thereof.

In a sixteenth aspect, there is provided a computer program, which, when running on a computer, enables the computer to perform the methods according to any one of the first to fourth aspects described above or various implementations thereof.

According to technical schemes of the first aspect and/or the third aspect, a RAR is received and sent by using a first RAR format uniformly on an unlicensed carrier and an licensed carrier, and a network device and a terminal device only need to receive and send a RAR in one format, thereby avoiding complexity in implementation of the network device and the terminal device.

According to technical schemes of the second aspect and/or the fourth aspect, a RAR is received and sent by using a first RAR format on an unlicensed carrier, and a RAR is received and sent by using a second RAR format on an licensed carrier, thereby avoiding redundant information contained in a RAR, reducing air interface overhead, and at the same time avoiding a problem of how to understand the redundant information by a terminal device.

DETAILED DESCRIPTION

Technical schemes in implementations of the present application will be described below with reference to drawings in the implementations of the present application. It is apparent that the implementations described are just some of the implementations of the present application, but not all of the implementations of the present application. Regarding the implementations in the present application, all other implementations achieved by a person of ordinary skill in the art without making inventive efforts are within protection scope of the present application.

The implementations of the present application may be applied to various communication systems, such as a Global System of Mobile Communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a New Radio (NR) system, an evolution system of the NR system, an LTE-based access to unlicensed spectrum (LTE-U) system, an NR-based access to unlicensed spectrum (NR-U) system, a Universal Mobile Telecommunication System (UMTS), Wireless Local Area Networks (WLAN), Wireless Fidelity (WiFi), a next generation communication system, or other communication systems.

Generally speaking, a traditional communication system supports a limited number of connections and is easy to implement. However, with development of communication technologies, a mobile communication system will not only support traditional communication, but also support, for example, Device to Device (D2D) communication, Machine to Machine (M2M) communication, Machine Type Communication (MTC), Vehicle to Vehicle (V2V) communication, and the implementations of the present application may also be applied to these communication systems.

Optionally, a communication system in the implementations of the present application may be applied to a Carrier Aggregation (CA) scenario, a Dual Connectivity (DC) scenario, or a Standalone (SA) network deployment scenario.

Applied spectrum is not limited in the implementations of the present application. For example, the implementations of the present application may be applied to licensed spectrum or unlicensed spectrum.

Figure 1:
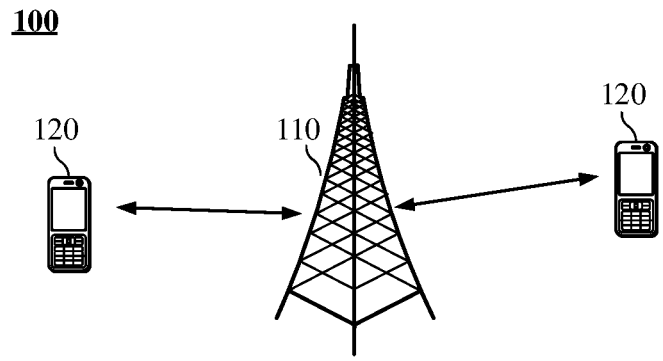
FIG. 1 is a schematic diagram of an architecture of a communication system provided in an implementation of the present application.

Illustratively, a communication system 100 applied in the implementations of the present application is shown in FIG. 1. The communication system 100 may include a network device 110. The network device 110 may be a device that communicates with a terminal device 120 (or referred to as a communication terminal, or a terminal). The network device 110 may provide communication coverage for a specific geographical area, and may communicate with a terminal device located within the coverage area.

FIG. 1 illustrates exemplarily one network device and two terminal devices. Optionally, the communication system 100 may include a plurality of network devices, and other numbers of terminal devices may be included within coverage area of each network device, which is not limited in the implementations of the present application.

Optionally, the communication system 100 may further include another network entity, such as a network controller and a mobile management entity, which is not limited in the implementations of the present application.

It should be understood that a device with a communication function in a network/system in the implementations of the present application may be referred to as a communication device. Taking the communication system 100 shown in FIG. 1 as an example, a communication device may include a network device 110 and terminal devices 120 which have communication functions, and the network device 110 and the terminal devices 120 may be specific devices described above, and will not be described repeatedly herein. The communication device may also include another device in the communication system 100, for example another network entity, such as a network controllers and a mobile management entity, which is not limited in the implementations of the present application.

It should be understood that terms "system" and "network" are often used interchangeably herein. A term "and/or" herein describes an association relationship between associated objects only, indicating that there may be three relationships, for example, A and/or B, may indicate three cases: A alone, both A and B, and B alone. In addition, a symbol "/" herein generally indicates that there is a "or" relationship between associated objects before and after "/".

The implementations of the present application describe various implementations in combination with a terminal device and a network device, wherein the terminal device may also be referred to as User Equipment (UE), an access terminal, a subscriber unit, a subscriber station, a mobile station, a rover station, a remote station, a remote terminal, a mobile device, a user terminal, a terminal, a wireless communication device, a user agent, or a user apparatus. The terminal device may be a STAION (ST) in a WLAN, a cellular phone, a cordless phone, a Session Initiation Protocol (SIP) phone, a Wireless Local Loop (WLL) station, a Personal Digital Assistant (PDA), a handheld device with a wireless communication function, a computing device or another processing device connected to a wireless modem, a vehicle-mounted device, a wearable device, or a terminal device in a next generation communication system, for example, a terminal device in a NR network, or a terminal device in a future evolved Public Land Mobile Network (PLMN).

By way of example but not limitation, in the implementations of the present application, the terminal device may be a wearable device. The wearable device may also be referred to as a wearable smart device, which is a generic term of wearable devices, such as glasses, gloves, watches, clothes, shoes, developed by intelligent design of daily wear using a wearable technology. The wearable device is a portable device that is worn directly on a body or integrated into clothes or accessories of a user. The wearable device not only is a hardware device, but also implements powerful functions through software support, data interaction and cloud interaction. Generalized wearable smart devices include full-function and large-sized devices such as smart watches or smart glasses, which may implement complete or partial functions without relying on smart phones, and devices such as various smart bracelets and smart jewelries for monitoring vital signs, which only focus on a certain kind of application function and need to be used in conjunction with other devices such as smart phones.

A network device may be a device for communicating with a mobile device, or may be an Access Point (AP) in a WLAN, or a Base Transceiver Station (BTS) in GSM or CDMA, or may be a NodeB (NB) in WCDMA, or may be an Evolutional Node B (eNB or eNodeB) in LTE, or a relay station or an access point, or a vehicle-mounted device, a wearable device, a network device or base station (gNB) in an NR network, or a network device in a future evolved PLMN.

In the implementations of the present application, a network device provides services for a cell, and a terminal device communicates with the network device through a transmission resource (e.g., a frequency domain resource or a spectrum resource) used by the cell. The cell may be a cell corresponding to the network device (e.g., a base station). The cell may be a macro base station, or a base station corresponding to a Small cell. The Small cell herein may include, for example, a Metro cell, a Micro cell, a Pico cell, a Femto cell, etc., which have characteristics such as small coverage range and low transmission power, and are suitable for providing high-speed data transmission services.

Generally speaking, a working band of NR-U is an unlicensed spectrum of 5 GHz and an unlicensed spectrum of 6 GHz. On an unlicensed spectrum, a design of NR-U should ensure fairness among systems, such as WiFi, that have already been working on these unlicensed spectrums. A principle of the fairness is that impact of NR-U on a system (such as WiFi) that has been deployed on an unlicensed spectrum cannot exceed impact between these systems.

In order to ensure coexistence of fairness among various systems on an unlicensed spectrum, energy detection has been agreed as a basic coexistence mechanism. A general energy detection mechanism is an LBT mechanism, a basic principle of which is that listen needs to be first performed for a period of time according to a regulation before a base station or a terminal (transmitting end) transmits data on an unlicensed spectrum. If a result of listen indicates that a channel is in an idle state, a transmitting end may transmit data to a receiving end. If the result of listen indicates that the channel is in an occupied state, the transmitting end needs to back off for a period of time according to a regulation and then continue to listen the channel, and can transmit data to the receiving end only when knowing that the result of listen is that the channel is in the idle state.

A random access procedure in the implementations of the present application may be a contention-based random access procedure or a non-contention-based random access procedure. For example, in a 5-Generation (5G) mobile communication technology system, a four-step process similar to LTE is adopted in a contention-based random access procedure.

In a first step, a terminal device sends a random access preamble (message 1, MSG 1) to a base station (gNB)

In a second step, after detecting the random access preamble sent by the terminal device, the base station sends a Random Access Response (RAR, i.e., message 2, MSG 2) to the terminal device to inform the terminal device of uplink resource information that may be used when sending MSG 3, allocates a temporary Radio Network Temporary Identity (RNTI) to the terminal device, and provides a Timing Advance Command (TAC) to the terminal device. If the terminal device does not detect the RAR in an RAR window, the terminal device retransmits a Physical Random Access Channel (PRACH) sequence; if the terminal device detects the RAR in the RAR window, the terminal device retransmits MSG 3 according to a UL grant indicated by the RAR.

In a third step, after receiving the RAR, the terminal device sends MSG 3 in an uplink resource designated by the RAR. This step allows Hybrid Automatic Repeat reQuest (HARQ) retransmission.

In a fourth step, the base station sends MSG 4, which includes a contention resolution message, to the terminal device. This step allows HARQ retransmission. When receiving MSG 4 sent by the base station, the terminal device will detect whether MSG 4 includes proprietary information of the terminal device. If yes, it is indicated that a random access procedure of the terminal device is successful; otherwise, it is indicated that the random access procedure fails, and the terminal device needs to initiate a random access procedure from the first step again.

In MSG 2 in the four-step random access procedure, the RAR sent by the base station to the terminal device is a response for MSG 1, a Random Access RNTI (RA-RNTI) used by the base station when sending the RAR is calculated according to a position of a time-frequency resource of the PRACH, and a PDSCH corresponding to a PDCCH scrambled by a RA-RNTI may include responses to multiple preamble sequences.

That the terminal device does not detect the RAR includes the following several situations: the PDCCH scrambled by the RA-RNTI is not detected; the PDCCH scrambled by the RA-RNTI is detected, but the corresponding PDSCH is not received correctly; and the PDSCH is received, but a RAR message corresponding to the MSG 1 is not included in the PDSCH.

It should be noted that that the terminal device detects the RAR may be understood as that the terminal device has received correctly the PDSCH scheduled by the PDCCH scrambled by the RA-RNTI according to the RA-RNTI calculated at a time-frequency resource position, where MSG 1 is sent, in the RAR window, and the RAR message corresponding to the MSG 1 is included in the PDSCH.

The terminal device detects the PDCCH scrambled by the RA-RNTI and detects the PDSCH scheduled by the PDCCH; at least one RAR message is included in the PDSCH, wherein one RAR message is a response to a preamble sent by the terminal device; each RAR message includes information such as a preamble ID, a TA, a UL grant, and a Temporary Cell RNTI (TC-RNTI); the UL grant includes the following scheduling information: frequency hopping flag, frequency domain resource allocation, time domain resource allocation, Modulation and Coding Scheme (MCS), Transmission Power Control (TPC) and Channel State Information (CSI) request.

If the RAR is detected in the RAR window, the terminal device transmits MSG 3 according to the UL grant included in the RAR message.

Specifically, a Media Access Control Protocol Data Unit (MAC PDU) includes one or more Media Access Control Sub Protocol Data Units (MAC subPDUs), one MAC subPDU may have a Backoff Indicator (BI) only, a Random Access Preamble ID (RAPID) only, or both a RAPID and a Media Access Control Random Access Response (MAC RAR).

Figure 2:
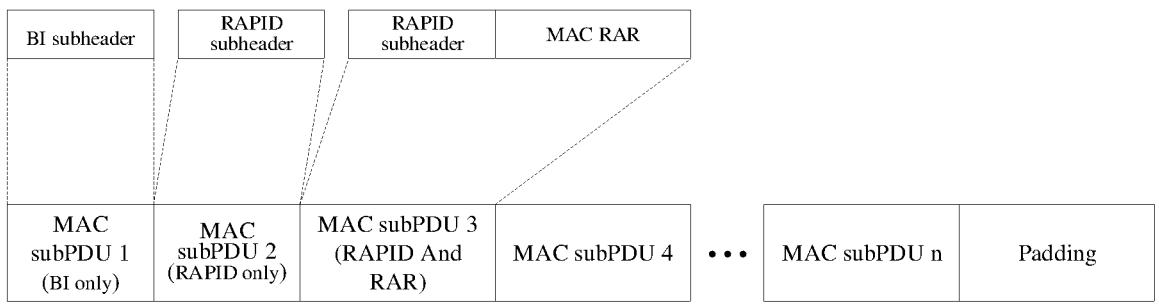
FIG. 2 is a schematic diagram of an MAC PDU provided in an implementation of the present application.

An example of a MAC PDU may be specifically shown in FIG. 2.

Figure 3:
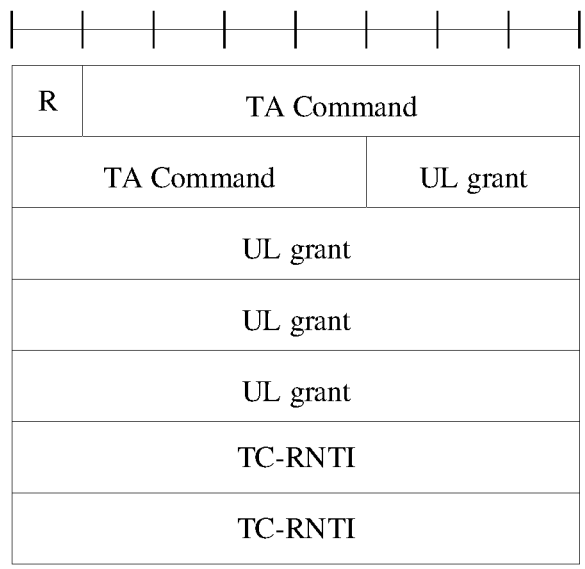
FIG. 3 is a schematic diagram of an MAC RAR provided in an implementation of the present application.

Each MAC RAR is fixed in size, as specifically shown in FIG. 3, and consists of: R: a reserved bit, set to "0"; TAC: 12 bits; UL grant: 27 bits; and TC-RNTI: 16 bits.

The UL grant of 27 bits in each MAC RAR specifically includes information shown in Table 1 below.

TABLE 1

| RAR licensed domain | Number of bits |
| --- | --- |
| Frequency hopping flag | 1 |
| PUSCH frequency domain resource allocation | 14 |
| PUSCH time domain resource allocation | 4 |
| MCS | 4 |
| TPC command for PUSCH | 3 |
| CSI request | 1 |

In MSG 3 in the four-step random access procedure, a version number of a Redundancy Version (RV) used for transmission of MSG 3 scheduled by the UL grant in the RAR is 0. If the base station fails to receive MSG 3, the base station will schedule retransmission of MSG 3 using a DCI format 0_0 scrambled by the TC-RNTI.

The DCI format 0_0 scrambled by the TC-RNTI includes: a Downlink Control Information (DCI) indicator (1 bit), frequency domain resource allocation (a size of which is determined according to a UL Band Width Part (BWP)), time domain resource allocation (4 bits), a frequency hopping flag (1 bit), MCS (5 bits), a new data indicator (DAI) (1 bit reserved), an RV (2 bits), a HARQ process number (4 bits reserved), a PUSCH power control command word (2 bits), and an uplink (UL)/Supplementary uplink (SUL) carrier indicator (1 bit). In MSG 4 in the four-step random access procedure, after receiving MSG 4, the terminal device performs a Physical Uplink Control Channel (PUCCH) feedback. If the terminal device responds a Negative Acknowledgment (NACK) for a decoding result received by MSG 4, the base station will perform HARQ retransmission for MSG 4. The base station will schedule initial transmission or retransmission of MSG 4 using a DCI format 1_0 scrambled by a Cell RNTI (C-RNTI) or the TC-RNTI.

If the terminal device receives a DCI format 1_0 scrambled by the C-RNTI and its corresponding PDSCH, random access is completed; if the terminal device receives a DCI format 1_0 scrambled by the TC-RNTI and its corresponding PDSCH and comparison of contents is successful, random access is completed.

However, in NR-U, a length of a RAR window may be greater than 10 ms, and a typical value may be 20 ms, 40 ms, or 60 ms, etc. Since a RAR window is lengthened, for example, 20 ms, it is assumed that UE1 sends MSG 1 at 0 ms using PRACH resource 1 and preamble 1, UE2 sends MSG 1 at 10 ms using PRACH resource 1 and preamble 1, a base station replies with a RAR at 15 ms, an adopted RA-RNTI related is carried in the RAR with PRACH resource 1 and preamble 1. Since both UE1 and UE2 select PRACH resource 1 and preamble 1, UE1 or UE2 cannot determine whether the RAR with which the base station replies is for itself. If the RAR is not for UE1 or UE2, but a UE determines that it is for itself and continues to perform random access, problems of random access delay and increasing power consumption of the UE will be caused.

Based on the above technical problems, an implementation of the present application provides a wireless communication method, in which a new RAR format (containing information such as an LBT category) is introduced into a NR-U random access procedure, so as to meet demand for NR-U random access.

A random access scheme designed for the above technical problems in the present application will be described in detail below.

Figure 4:
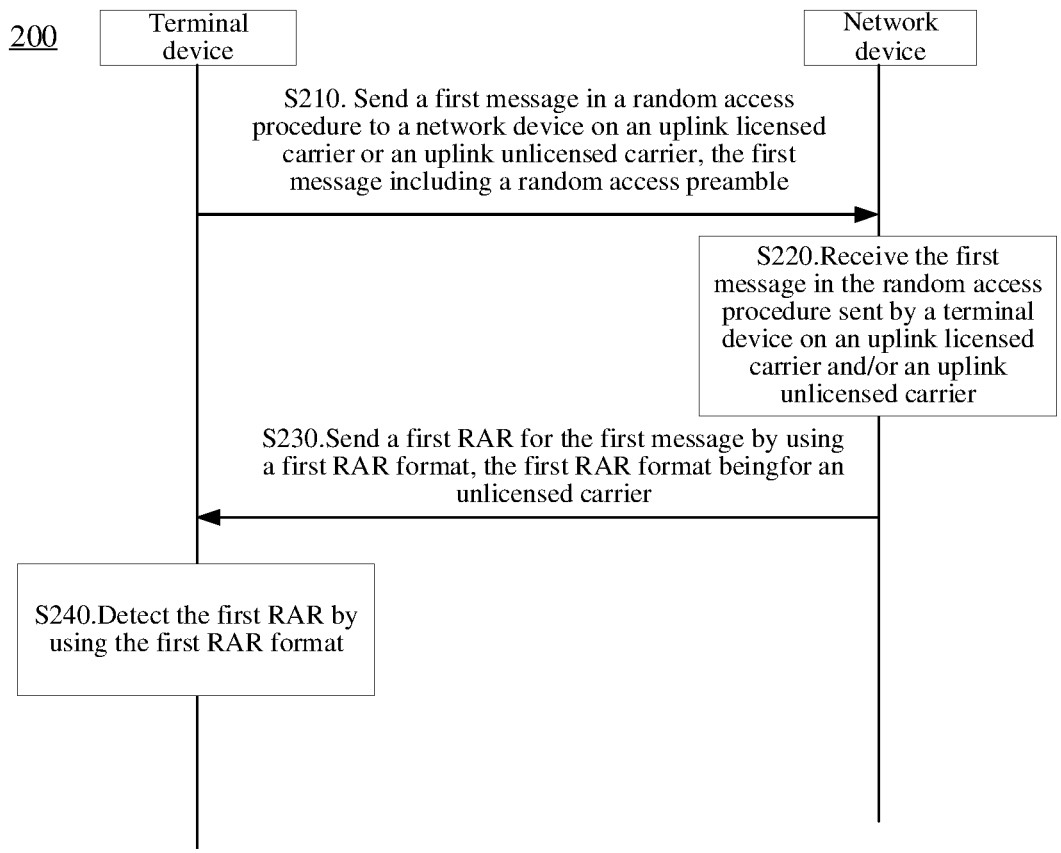
FIG. 4 is a schematic flow chart of a wireless communication method provided according to an implementation of the present application.
Figure 5:
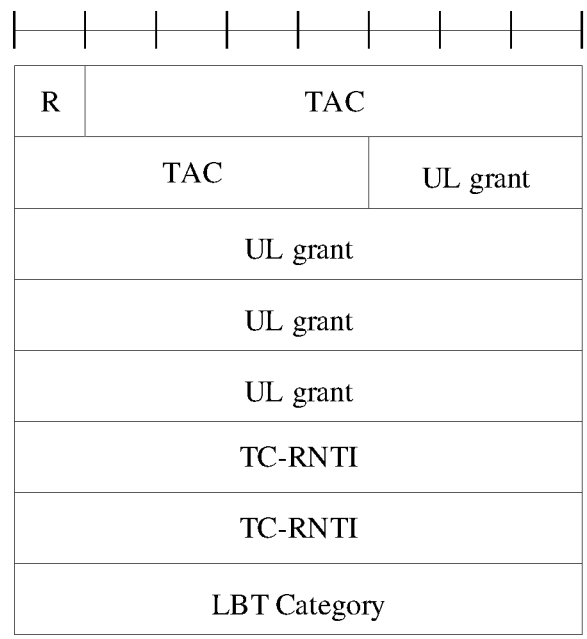
FIG. 5 is a schematic diagram of a first RAR format provided according to an implementation of the present application.
Figure 6:
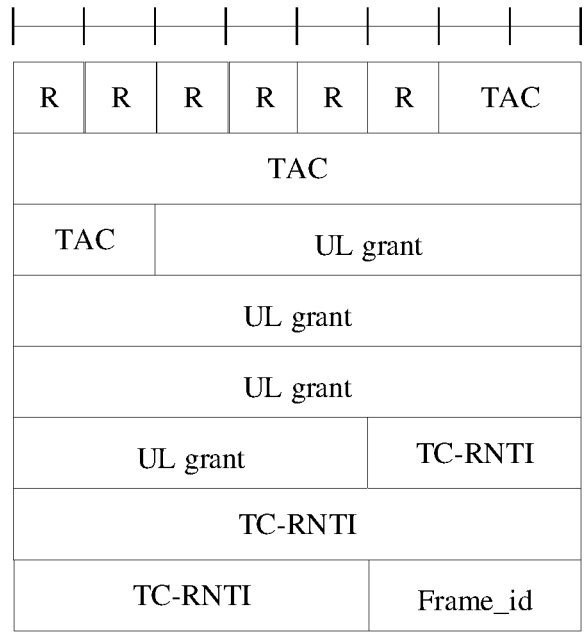
FIG. 6 is a schematic diagram of another first RAR format provided according to an implementation of the present application.
Figure 7:
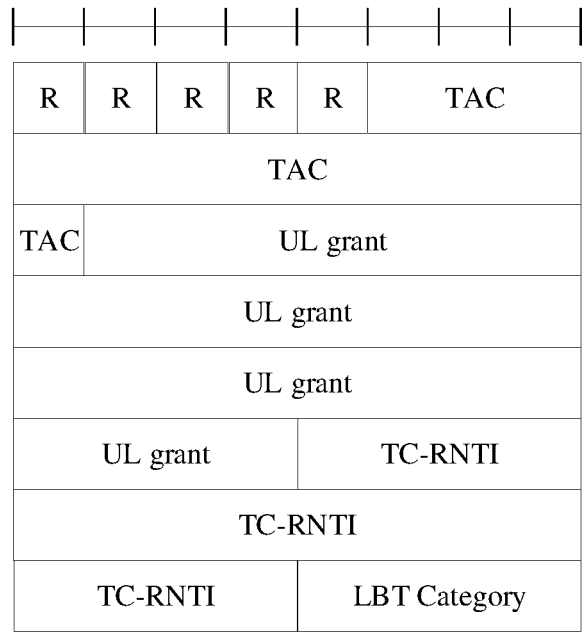
FIG. 7 is a schematic diagram of still another first RAR format provided according to an implementation of the present application.
Figure 8:
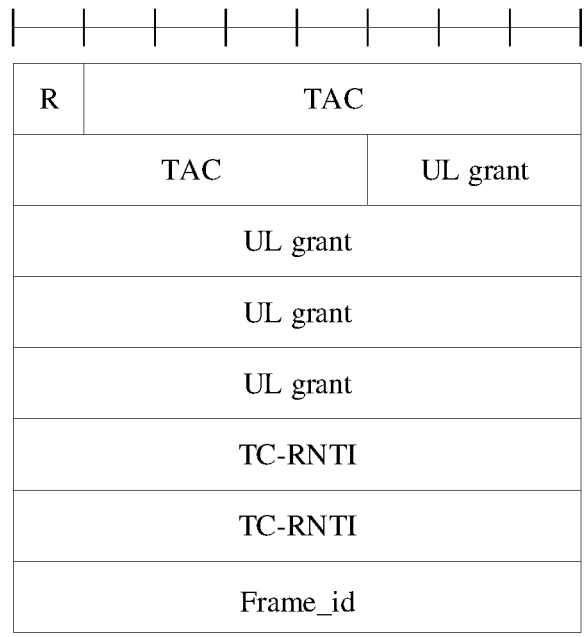
FIG. 8 is a schematic diagram of yet another first RAR format provided according to an implementation of the present application.
Figure 9:
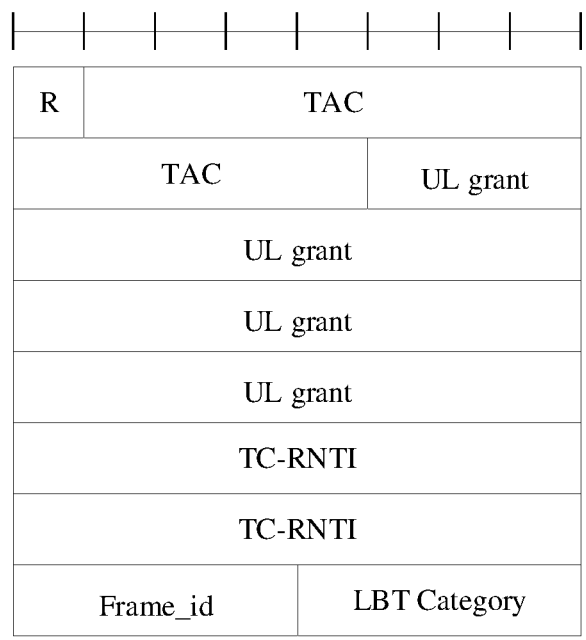
FIG. 9 is a schematic diagram of yet another first RAR format provided according to an implementation of the present application.
Figure 10:
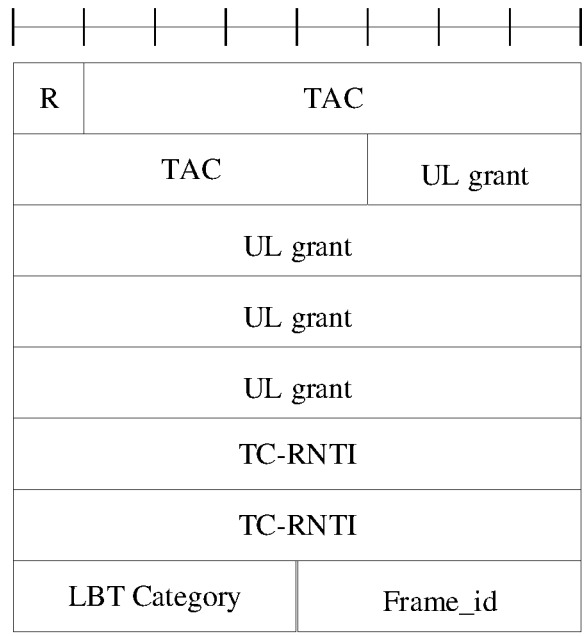
FIG. 10 is a schematic diagram of yet another first RAR format provided according to an implementation of the present application.
Figure 11:
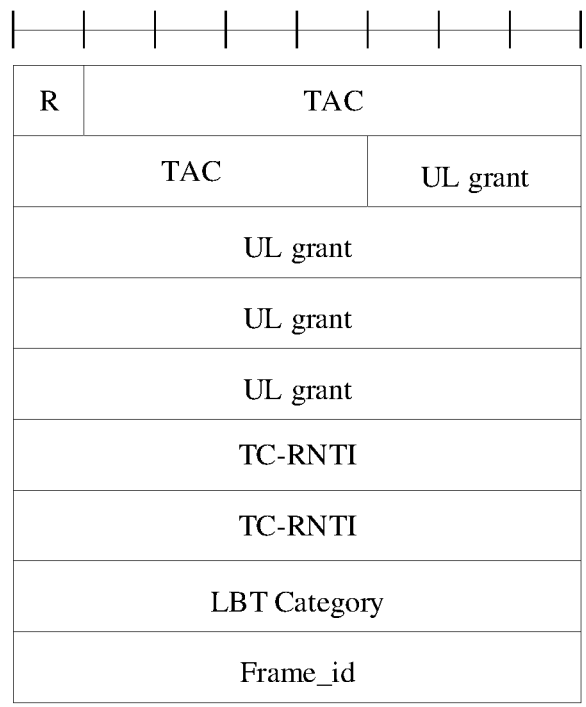
FIG. 11 is a schematic diagram of yet another first RAR format provided according to an implementation of the present application.
Figure 12:
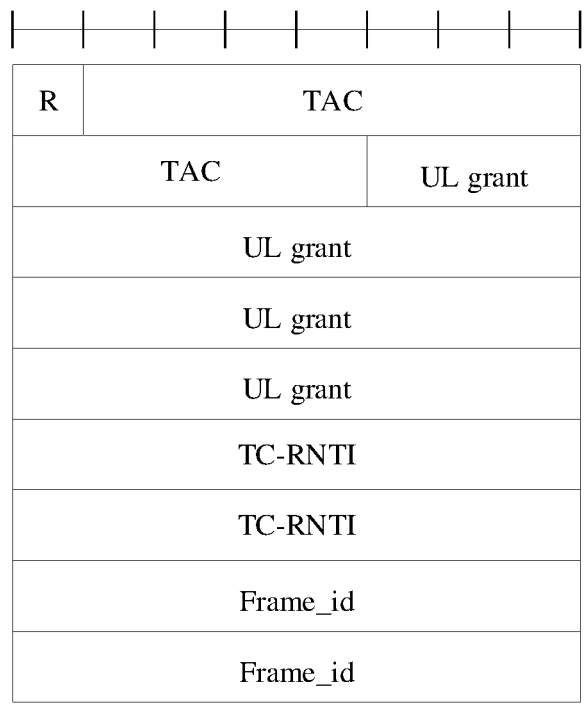
FIG. 12 is a schematic diagram of yet another first RAR format provided according to an implementation of the present application.
Figure 13:
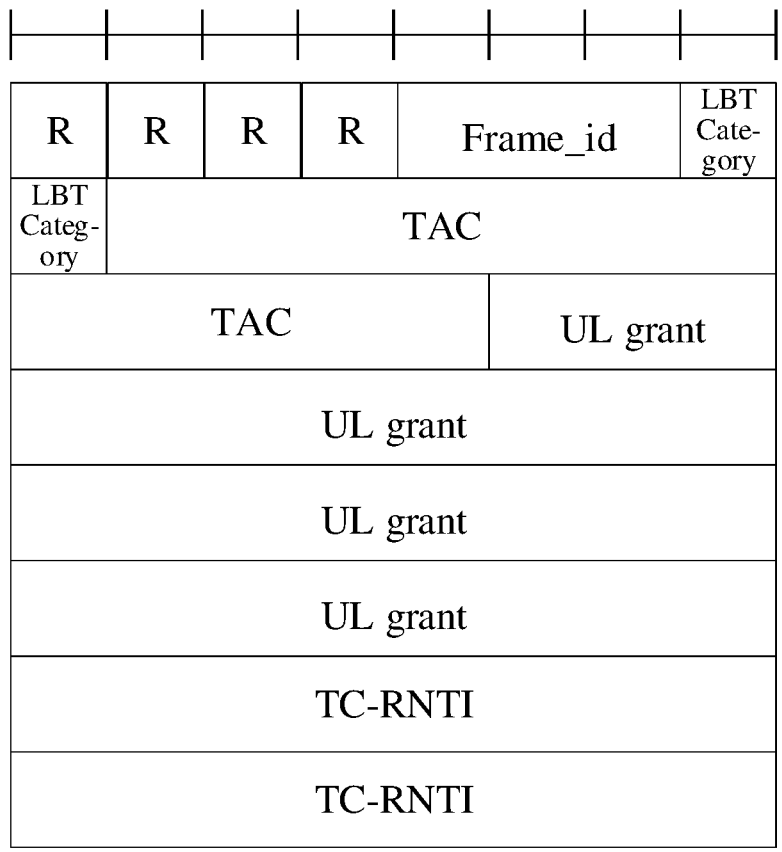
FIG. 13 is a schematic diagram of yet another first RAR format provided according to an implementation of the present application.

FIG. 4 is a schematic flow chart of a wireless communication method 200 according to an implementation of the present application. As shown in FIG. 4, the method 200 may include a portion or all of the following contents.

In S210, a terminal device sends a first message in a random access procedure to a network device on an uplink licensed carrier or an uplink unlicensed carrier, the first message includes a random access preamble.

In S220, the network device receives the first message in the random access procedure sent by the terminal device on the uplink licensed carrier and/or the uplink unlicensed carrier.

In S230, the network device sends a first RAR for the first message using a first RAR format, the first RAR format is for an unlicensed carrier.

In S240, the terminal device detects the first RAR using the first RAR format.

Optionally, the method 200 may be applied to a contention-based random access procedure or a non-contention-based random access procedure. The method 200 may be applied to a four-step random access procedure or a two-step random access procedure.

It should be noted that in the case that the method 200 is applied to the two-step random access procedure, the first message may also include some other information, for example, the first message may also include a Physical Uplink Shared Channel (PUSCH).

In the implementation of the present application, regardless of whether the first message is transmitted on the uplink licensed carrier or the uplink unlicensed carrier, the network device sends the first RAR using the first RAR format, and the terminal device detects or receives the first RAR using the first RAR format.

It should be noted that after the network device receives the first message through the uplink licensed carrier and receives the first message through the uplink unlicensed carrier, RARs may be fed back respectively, that is, at least two second messages (RARs) are fed back respectively.

For example, when the network device receives a first message sent by terminal device 1 on an uplink licensed carrier and a first message sent by terminal device 2 on an uplink unlicensed carrier, RARs may be fed back respectively, that is, at least two second messages (RARs) are fed back respectively.

It should be noted that the first RAR format is different from an MAC RAR shown above in FIG. 3, that is, the first RAR format is a new RAR format designed in the present application.

Accordingly, when a downlink carrier is a downlink licensed carrier or a downlink unlicensed carrier, the network device sends a response to the first message using the first RAR format.

Optionally, in the implementation of the present application, the first RAR format includes first information for an unlicensed carrier, and the first information includes at least one piece of the following information: an LBT category used for indicating a channel access level or mechanism; and frame information used for indicating System Frame Number (SFN) information in which a Physical Random Access Channel (PRACH) is located.

Optionally, the first RAR format may also include some other information, such as a TAC, a UL-Grant, and a TC-RNTI.

Optionally, the frame information may be a frame identifier (frame_id) or frame indication information.

For example, taking the frame information being the frame_id as an example, the first RAR format may be that as shown in FIGS. 5 to 13. Of course, the first RAR format may be a variant based on the RAR format as shown in FIGS. 5 to 13, which is not limited in the present application.

Optionally, part or all of information included in the first information is identified or indicated by a bitmap.

Optionally, the LBT category occupies one of the following bit resources: 1 bit, 2 bits, 3 bits, 4 bits, or 8 bits.

Specifically, it is assumed that four LBT categories, which may be indicated using 2 bits or 4 bits, are supported. For example, when a 2-bit identifier is used, 00 represents LBT category 1, 01 represents LBT category 2, 10 represents LBT category 3, and 11 represents LBT category 4; or when a 4-bit identifier is used, 0000 represents LBT category 1, 0010 represents LBT category 2, 0100 represents LBT category 3, and 1000 represents LBT category 4.

It should be noted that there may be three commonly used channel access types in a process in which the communication device performs LBT.

LBT category 1: transmission is performed immediately after switching gap ends.

LBT category 2: single slot detection, also referred to as LBT without random backoff.

LBT category 4: LBT of random backoff based on variable Contention Window Size (CWS).

Specific application conditions of LBT category 1, LBT category 2, and LBT category 4 may be referred to related art or evolution technologies of the related art, and will not be repeated herein for brevity.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

For example, the frame information is a frame_id which occupies one of the following bit resources: 1 bit, 2 bits, 3 bits, 4 bits, 8 bits, 14 bits, or 16 bits.

Specifically, a frame_id may be an absolute SFN (i.e., an SFN for transmission of a PRACH or an SFN in which a PRACH occasion is located) or a relative SFN (i.e., an SFN in which a PRACH occasion is located modulo the maximum RAR window size at a level of an infinite frame). When a frame_id is 14 or 16 bits, it may represent an absolute value of an SFN, such as SFN 10230. When the frame_id is 1 bit, 2 bits, 3 bits, 4 bits, or 8 bits, it may represent a value after modulo of an SFN. Optionally, the frame_id may be indicated by way of bitmap. For example, if a RAR window is less than or equal to 20 ms, 1 bit may be occupied, wherein 0 represents an SFN where a frame in which a PRACH occasion is located modulo a RAR window size in subframe=0, and 1 represents an SFN where a frame in which a PRACH occasion is located modulo a RAR window size in subframe=1; or 2 bits may be occupied, wherein the lowest bit (i.e., 01) represents an SFN where a frame in which a PRACH occasion is located modulo a RAR window size in subframe=0, and the highest bit (i.e., 10) represents an SFN where a frame in which a PRACH occasion is located modulo a RAR window size in subframe=1.

As another example, the frame information is frame indication information, which occupies one of the following bit resources: 1 bit, 2 bits, 3 bits, or 4 bits. Specifically, the frame indication information may be indicated by way of bitmap. For example, if a RAR window is less than or equal to 20 ms, 1 bit may be occupied, wherein 0 indicates that a frame in which a PRACH occasion is located is an odd frame, and 1 indicates that a frame in which a PRACH occasion is located is an even frame; or 2 bits may be occupied, wherein the lowest bit (i.e., 01) indicates that a frame in which a PRACH occasion is located is an odd frame, and the highest bit (i.e., 10) indicates that a frame in which a PRACH occasion is located is an even frame. As another example, if a RAR window is less than or equal to 40 ms, 2 bits may be occupied, wherein 00 represents an SFN where a frame in which a PRACH occasion is located modulo a RAR window size in subframe=0, 01 represents an SFN where a frame in which a PRACH occasion is located modulo a RAR window size in subframe=1, 10 represents an SFN where a frame in which a PRACH occasion is located modulo a RAR window size in subframe=2, and 11 represents an SFN where a frame in which a PRACH occasion is located modulo a RAR window size in subframe=3; or 4 bits may be used for indication.

Optionally, in the implementation of the present application, if the terminal device sends the first message on the uplink licensed carrier, the terminal device ignores or discards or does not decode second information for an unlicensed spectrum in the first RAR.

Optionally, in the implementation of the present application, if the terminal device sends the first message on the uplink licensed carrier and second information for an unlicensed spectrum in the first RAR is a default value, the terminal device ignores or discards the second information in the first RAR.

Optionally, the second information includes at least one of: an LBT category used for indicating a channel access level or mechanism; and frame information used for indicating SFN information in which a PRACH is located.

Optionally, the above step S240 may specifically include: the terminal device detects the first RAR using the first RAR format on a downlink licensed carrier or a downlink unlicensed carrier.

In the implementation of the present application, taking a contention-based four-step random access procedure as an example, after the terminal device detects the first RAR (MSG 2) using the first RAR format, the terminal device sends MSG 3 according to information indicated by the first RAR. The network device generates MSG 4 after receiving MSG 3. The terminal device receives MSG 4 and determines whether the random access procedure is successful according to MSG 4. If the random access procedure is successful, the terminal device performs normal data transmission with the network device subsequently; otherwise, the terminal device reinitiates a random access procedure.

Therefore, in the implementation of the present application, a RAR is received and sent using a first RAR format uniformly on an unlicensed carrier and an licensed carrier, and a network device and a terminal device only need to receive and send the RAR in one format, thereby avoiding complexity in implementation of the network device and the terminal device.

Figure 14:
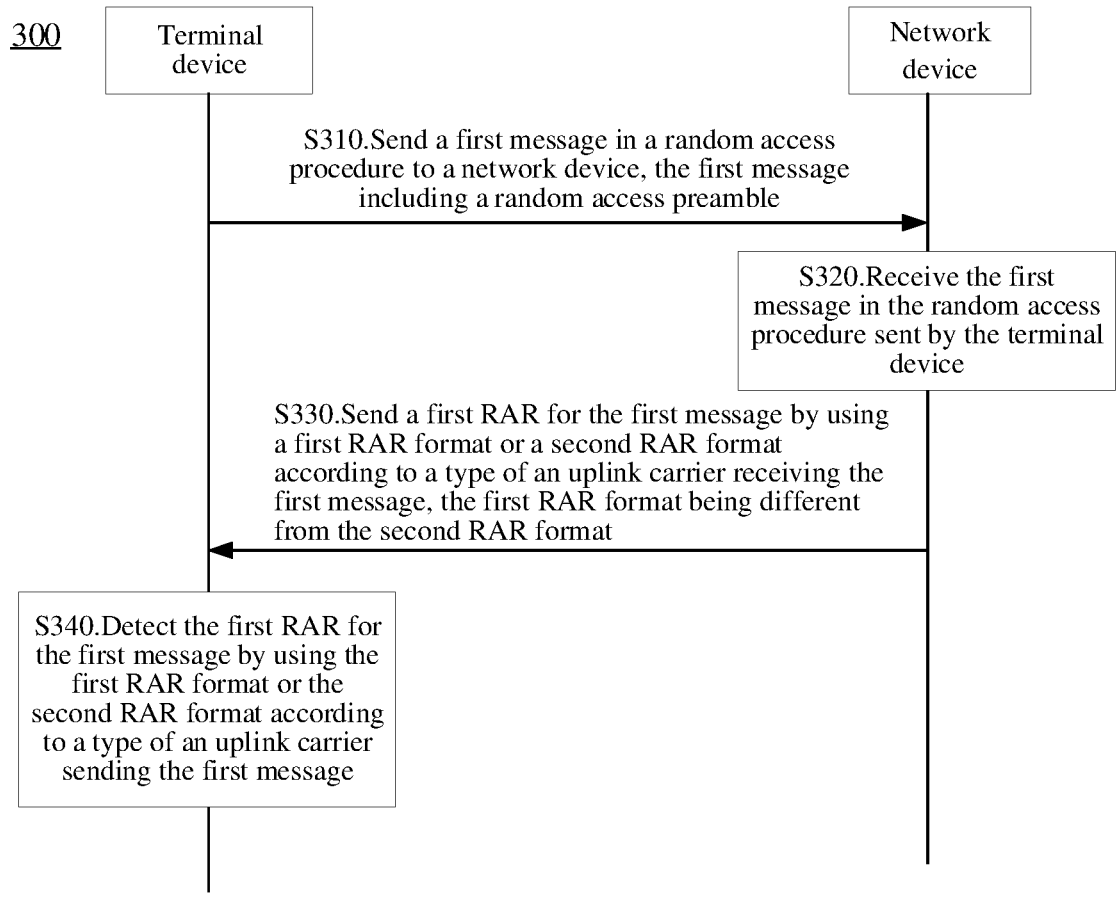
FIG. 14 is a schematic flow chart of another wireless communication method provided according to an implementation of the present application.

FIG. 14 is a schematic flow chart of a wireless communication method 300 according to an implementation of the present application. As shown in FIG. 14, the method 300 may include a portion or all of the following contents.

In S310, a terminal device sends a first message in a random access procedure to a network device, and the first message includes a random access preamble.

In S320, the network device receives the first message in the random access procedure sent by the terminal device.

In S330, the network device sends a first RAR for the first message by using a first RAR format or a second RAR format according to a type of an uplink carrier receiving the first message, and the first RAR format is different from the second RAR format.

In S340, the terminal device detects the first RAR for the first message by using the first RAR format or the second RAR format according to a type of an uplink carrier sending the first message.

Optionally, the method 300 may be applied to a contention-based random access procedure or a non-contention-based random access procedure. The method 300 may be applied to a four-step random access procedure or a two-step random access procedure.

It should be noted that in the case that the method 300 is applied to the two-step random access procedure, the first message may also include some other information, for example, the first message may also include a PUSCH.

In the implementation of the present application, if the first message is transmitted on an uplink unlicensed carrier, the network device sends the first RAR using the first RAR format, and the terminal device detects or receives the first RAR by using the first RAR format. If the first message is transmitted on an uplink licensed carrier, the network device sends the first RAR using the second RAR format, and the terminal device detects or receives the first RAR by using the second RAR format.

It should be noted that the first RAR format is different from the MAC RAR shown above in FIG. 3, that is, the first RAR format is a new RAR format designed in the present application, and the second RAR format may be shown in FIG. 3.

Optionally, in the implementation of the present application, the first RAR format includes first information for an unlicensed carrier, and the second RAR format does not include the first information.

Optionally, the first information includes at least one piece of the following information: an LBT category used for indicating a channel access level or mechanism; and frame information used for indicating SFN information in which a PRACH is located.

Optionally, the first RAR format may also include some other information, such as a TAC, a UL-Grant, and a TC-RNTI.

Optionally, the frame information may be a frame identifier (frame_id) or frame indication information.

For example, taking the frame information being the frame_id as an example, the first RAR format may be as shown in FIGS. 5 to 13. Of course, the first RAR format may be a variant based on the RAR format as shown in FIGS. 5 to 13, which is not limited in the present application.

Optionally, part or all of information included in the first information is identified or indicated by a bitmap.

Optionally, the LBT category occupies one of the following bit resources: 1 bit, 2 bits, 3 bits, 4 bits, or 8 bits.

Specifically, it is assumed that four LBT categories, which may be indicated using 2 bits or 4 bits, are supported. For example, when a 2-bit identifier is used, 00 represents LBT category 1, 01 represents LBT category 2, 10 represents LBT category 3, and 11 represents LBT category 4; or when a 4-bit identifier is used, 0000 represents LBT category 1, 0010 represents LBT category 2, 0100 represents LBT category 3, and 1000 represents LBT category 4.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

For example, the frame information is a frame_id which occupies one of the following bit resources: 1 bit, 2 bits, 3 bits, 4 bits, 8 bits, 14 bits, or 16 bits.

Specifically, the frame_id may be an absolute SFN (i.e., an SFN for transmitting a PRACH or an SFN in which a PRACH occasion is located) or a relative SFN (i.e., an SFN in which a PRACH occasion is located modulo the maximum RAR window size at a level of an infinite frame). When the frame_id is 14 or 16 bits, it may represent an absolute value of an SFN, such as SFN 10230. When the frame_id is 1 bit, 2 bits, 3 bits, 4 bits, or 8 bits, it may represent a value after modulo of an SFN. Optionally, the frame_id may be indicated by way of bitmap. For example, if a RAR window is less than or equal to 20 ms, 1 bit may be occupied, wherein 0 represents an SFN where a frame in which a PRACH occasion is located modulo a RAR window size in subframe=0, and 1 represents an SFN where a frame in which a PRACH occasion is located modulo a RAR window size in subframe=1; or 2 bits may be occupied, wherein the lowest bit (i.e., 01) represents an SFN where a frame in which a PRACH occasion is located modulo a RAR window size in subframe=0, and the highest bit (i.e., 10) represents an SFN where a frame in which a PRACH occasion is located modulo a RAR window size in subframe=1.

As another example, the frame information is frame indication information, which occupies one of the following bit resources: 1 bit, 2 bits, 3 bits, or 4 bits.

Specifically, the frame indication information may be indicated by way of bitmap. For example, if a RAR window is less than or equal to 20 ms, 1 bit may be occupied, wherein 0 indicates that a frame in which a PRACH occasion is located is an odd frame, and 1 indicates that a frame in which a PRACH occasion is located is an even frame; or 2 bits may be occupied, wherein the lowest bit (i.e., 01) indicates that a frame in which a PRACH occasion is located is an odd frame, and the highest bit (i.e., 10) indicates that a frame in which a PRACH occasion is located is an even frame. As another example, if a RAR window is less than or equal to 40 ms, 2 bits may be occupied, wherein 00 represents an SFN where a frame in which a PRACH occasion is located modulo a RAR window size in subframe=0, 01 represents an SFN where a frame in which a PRACH occasion is located modulo a RAR window size in subframe=1, 10 represents an SFN where a frame in which a PRACH occasion is located modulo a RAR window size in subframe=2, and 11 represents an SFN where a frame in which a PRACH occasion is located modulo a RAR window size in subframe=3; or 4 bits may be used for indication.

Optionally, in the implementation of the present application, the uplink carrier is an uplink unlicensed carrier or an uplink licensed carrier.

Optionally, the above step S330 may specifically include: the network device sends the first RAR by using the first RAR format if the network device receives the first message sent by the terminal device on an uplink unlicensed carrier; and/or, the network device sends the first RAR by using the second RAR format if the network device receives the first message sent by the terminal device on an uplink licensed carrier.

Optionally, the network device may send the first RAR on a downlink licensed carrier or a downlink unlicensed carrier.

Optionally, the above step S330 may further include: optionally, the network device may send the first RAR using the first RAR format on a downlink unlicensed carrier, and/or, may send the first RAR using the second RAR format on a downlink licensed carrier. Optionally, as mode 1, the above step S330 may further include at least one of: the network device sends the first RAR by using the first RAR format on a downlink unlicensed carrier if the network device receives the first message on an uplink unlicensed carrier; the network device sends the first RAR by using the second RAR format on a downlink unlicensed carrier if the network device receives the first message on an uplink licensed carrier; the network device sends the first RAR by using the first RAR format on a downlink licensed carrier if the network device receives the first message on an uplink unlicensed carrier; and the network device sends the first RAR by using the second RAR format on a downlink licensed carrier if the network device receives the first message on an uplink licensed carrier.

For example, in mode 1, the first message may at least include the LBT category and/or the frame information.

Optionally, as mode 2, the above step S330 may further include at least one of: the network device sends the first RAR using the first RAR format on a downlink licensed carrier if the network device receives the first message on an uplink unlicensed carrier; the network device sends the first RAR by using the second RAR format on a downlink licensed carrier if the network device receives the first message on an uplink licensed carrier; the network device sends the first RAR by using the first RAR format on a downlink unlicensed carrier if the network device receives the first message on an uplink licensed carrier; and the network device sends the first RAR by using the first RAR format on a downlink unlicensed carrier if the network device receives the first message on an uplink unlicensed carrier.

For example, in mode 2, the first message may at least include the LBT category and/or the frame information.

Optionally, as mode 3, the above step S330 may further include at least one of: the network device sends the first RAR by using the first RAR format on a downlink unlicensed carrier if the network device receives the first message on an uplink unlicensed carrier; the network device sends the first RAR by using the first RAR format on a downlink unlicensed carrier if the network device receives the first message on an uplink licensed carrier; the network device sends the first RAR by using the second RAR format on a downlink licensed carrier if the network device receives the first message on an uplink unlicensed carrier; and the network device sends the first RAR by using the second RAR format on a downlink licensed carrier if the network device receives the first message on an uplink licensed carrier.

For example, in mode 3, the first message may at least include the frame information. Optionally, the above step S340 may specifically include: the terminal device detects the first RAR by using the first RAR format if the terminal device sends the first message to the network device on an uplink unlicensed carrier; and/or, the terminal device detects the first RAR by using the second RAR format if the terminal device sends the first message to the network device on an uplink licensed carrier.

Optionally, the terminal device may detect the first RAR on a downlink licensed carrier or a downlink unlicensed carrier.

Optionally, the above step S340 may further include: optionally, the terminal device may detect the first RAR by using the first RAR format on a downlink unlicensed carrier, and/or, may detect the first RAR by using the second RAR format on a downlink licensed carrier.

Optionally, as mode a, the above step S340 may further include at least one of: the terminal device detects the first RAR by using the first RAR format on a downlink unlicensed carrier if the terminal device sends the first message on an uplink unlicensed carrier; the terminal device detects the first RAR by using the second RAR format on a downlink unlicensed carrier if the terminal device sends the first message on an uplink licensed carrier; the terminal device detects the first RAR by using the first RAR format on a downlink licensed carrier if the terminal device sends the first message on an uplink unlicensed carrier; and the terminal device detects the first RAR by using the second RAR format on a downlink licensed carrier if the terminal device sends the first message on an uplink licensed carrier.

For example, in mode a, the first message may at least include the LBT category and/or the frame information.

Optionally, as mode b, the above step S340 may include at least one of: the terminal device detects the first RAR by using the first RAR format on a downlink licensed carrier if the terminal device sends the first message on an uplink unlicensed carrier; the terminal device detects the first RAR by using the second RAR format on a downlink licensed carrier if the terminal device sends the first message on an uplink licensed carrier; the terminal device detects the first RAR by using the first RAR format on a downlink unlicensed carrier if the terminal device sends the first message on an uplink licensed carrier; and the terminal device detects the first RAR by using the first RAR format on a downlink unlicensed carrier if the terminal device sends the first message on an uplink unlicensed carrier.

For example, in mode b, the first message may at least include the LBT category and/or the frame information.

Optionally, as mode c, the above step S330 may further include at least one of: the terminal device detects the first RAR by using the first RAR format on a downlink unlicensed carrier if the terminal device sends the first message on an uplink unlicensed carrier; the terminal device detects the first RAR by using the first RAR format on a downlink unlicensed carrier if the terminal device sends the first message on an uplink licensed carrier; the terminal device detects the first RAR by using the second RAR format on a downlink licensed carrier if the terminal device sends the first message on an uplink unlicensed carrier; and the terminal device detects the first RAR by using the second RAR format on a downlink licensed carrier if the terminal device sends the first message on an uplink licensed carrier.

For example, in mode c, the first message may at least include the frame information.

In the implementation of the present application, taking a contention-based four-step random access procedure as an example, after the terminal device detects the first RAR (MSG 2) using the first RAR format or the second RAR format, the terminal device sends MSG 3 according to information indicated by the first RAR. Specifically, if the first RAR is sent by using the first RAR format, that is, the first RAR carries such as an LBT category, then the terminal device sends MSG 3 according to demand for the LBT category. For example, when the LBT category is 1, the terminal device sends MSG 3 after waiting for a short gap. If the first RAR is sent by using the second RAR format, the terminal device performs transmission according to a traditional random access procedure, that is, after MSG 2 is received, the terminal device starts to prepare and transmit an MAC PDU according to a UL-grant given in the first RAR. The network device generates MSG 4 after receiving MSG 3, and the terminal device receives MSG 4 and determines whether the random access procedure is successful according to MSG 4. If the random access procedure is successful, the terminal device performs normal data transmission with the network device subsequently; otherwise, the terminal device reinitiates a random access procedure.

Therefore, in the implementation of the present application, a RAR is received and sent by using a first RAR format on an unlicensed carrier, and a RAR is received and sent by using a second RAR format on an licensed carrier, thereby avoiding redundant information contained in the RAR, reducing air interface overhead, and at the same time avoiding a problem of how to understand the redundant information by the terminal device.

Figure 15:
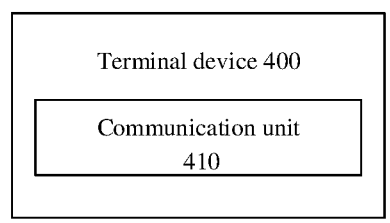
FIG. 15 is a schematic block diagram of a terminal device provided according to an implementation of the present application.

FIG. 15 is a schematic block diagram of a terminal device 400 according to an implementation of the present application. As shown in FIG. 15, the terminal device 400 includes a communication unit 410.

The communication unit 410 is configured to send a first message in a random access procedure to a network device on an uplink licensed carrier or an uplink unlicensed carrier, the first message includes a random access preamble.

The communication unit 410 is further configured to detect a first RAR for the first message by using a first RAR format, the first RAR format is for an unlicensed carrier.

Optionally, the first RAR format includes first information for an unlicensed carrier, and the first information includes at least one piece of the following information: an LBT category used for indicating a channel access level or mechanism; and frame information used for indicating SFN information in which a PRACH is located.

Optionally, part or all of information included in the first information is identified or indicated by a bitmap.

Optionally, the LBT category occupies one of the following bit resources: 1 bit, 2 bits, 3 bits, 4 bits, or 8 bits.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

Optionally, the terminal device 400 further includes a processing unit 420.

The processing unit 420 is configured to ignore or discard or not decode second information for an unlicensed spectrum in the first RAR if the terminal device 400 sends the first message on an uplink licensed carrier.

Optionally, the terminal device 400 further includes a processing unit 420.

The processing unit 420 is configured to ignore or discard second information in the first RAR if the terminal device 400 sends the first message on an uplink licensed carrier and the second information for an unlicensed spectrum in the first RAR is a default value.

Optionally, the second information includes at least one of: an LBT category used for indicating a channel access level or mechanism; and frame information used for indicating SFN information in which a PRACH is located.

Optionally, the communication unit 410 is specifically configured to: detect the first RAR using the first RAR format on a downlink licensed carrier or a downlink unlicensed carrier.

It should be understood that the terminal device 400 according to an implementation of the present application may correspond to the terminal device in the method implementation of the present application, and the above and other operations and/or functions of various units in the terminal device 400 are respectively performed in order to implement the corresponding processes of the terminal device in the method 200 as shown in FIG. 4, and will not be repeated herein for brevity.

Figure 16:
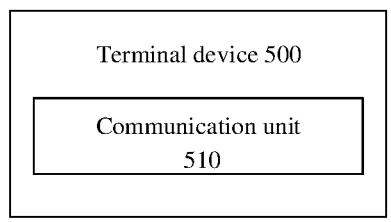
FIG. 16 is a schematic block diagram of another terminal device provided according to an implementation of the present application.

FIG. 16 is a schematic block diagram of a terminal device 500 according to an implementation of the present application. As shown in FIG. 16, the terminal device 500 includes a communication unit 510.

The communication unit 510 is configured to send a first message in a random access procedure to a network device, the first message includes a random access preamble.

The communication unit 510 is further configured to detect a first RAR for the first message using a first RAR format or a second RAR format according to a type of an uplink carrier sending the first message, the first RAR format is different from the second RAR format.

Optionally, the uplink carrier is an uplink unlicensed carrier or an uplink licensed carrier, and the communication unit 510 is specifically configured to: detect the first RAR by using the first RAR format if the terminal device 500 sends the first message to the network device on an uplink unlicensed carrier; and/or detect the first RAR by using the second RAR format if the terminal device 500 sends the first message to the network device on an uplink licensed carrier.

Optionally, the first RAR format includes first information for an unlicensed carrier, and the second RAR format does not include the first information.

Optionally, the first information includes at least one piece of the following information: an LBT category used for indicating a channel access level or mechanism; and frame information used for indicating SFN information in which a PRACH is located.

Optionally, part or all of information included in the first information is identified or indicated by a bitmap.

Optionally, the LBT category occupies one of the following bit resources: 1 bit, 2 bits, 3 bits, 4 bits, or 8 bits.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

Optionally, the communication unit 510 is specifically configured to: detect the first RAR using the first RAR format or the second RAR format on a downlink licensed carrier or a downlink unlicensed carrier according to a type of an uplink carrier sending the first message.

Optionally, the communication unit 510 is specifically configured to: detect the first RAR by using the first RAR format on a downlink unlicensed carrier if the terminal device 500 sends the first message on an uplink unlicensed carrier; and/or detect the first RAR by using the second RAR format on a downlink unlicensed carrier if the terminal device 500 sends the first message on an uplink licensed carrier.

Optionally, the communication unit 510 is specifically configured to: detect the first RAR by using the first RAR format on a downlink licensed carrier if the terminal device 500 sends the first message on an uplink unlicensed carrier; and/or detect the first RAR by using the second RAR format on a downlink licensed carrier if the terminal device 500 sends the first message on an uplink licensed carrier; and/or detect the first RAR by using the first RAR format on a downlink unlicensed carrier if the terminal device 500 sends the first message on an uplink licensed carrier.

It should be understood that the terminal device 500 according to an implementation of the present application may correspond to the terminal device in the method implementation of the present application, and the above and other operations and/or functions of various units in the terminal device 500 are respectively performed in order to implement the corresponding processes of the terminal device in the method 300 as shown in FIG. 14, and will not be repeated herein for brevity.

Figure 17:
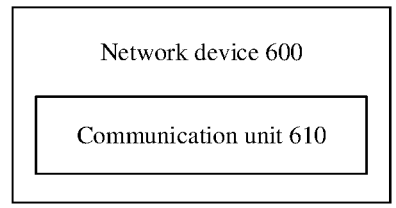
FIG. 17 is a schematic block diagram of a network device provided according to an implementation of the present application.

FIG. 17 is a schematic block diagram of a network device 600 according to an implementation of the present application. As shown in FIG. 17, the network device 600 includes a communication unit 610.

The communication unit 610 is configured to receive a first message in a random access procedure sent by a terminal device on an uplink licensed carrier or an uplink unlicensed carrier, and the first message includes a random access preamble.

The communication unit 610 is further configured to send a first RAR for the first message by using a first RAR format, and the first RAR format is for an unlicensed carrier.

Optionally, the first RAR format includes first information for an unlicensed carrier, and the first information includes at least one piece of the following information: an LBT category used for indicating a channel access level or mechanism; and frame information used for indicating SFN information in which a PRACH is located.

Optionally, part or all of information included in the first information is identified or indicated by a bitmap.

Optionally, the LBT category occupies one of the following bit resources: 1 bit, 2 bits, 3 bits, 4 bits, or 8 bits.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

Optionally, the communication unit 610 is specifically configured to: send the first RAR using the first RAR format on a downlink licensed carrier or a downlink unlicensed carrier.

It should be understood that the network device 600 according to an implementation of the present application may correspond to the network device in the method implementation of the present application, and the above and other operations and/or functions of various units in the network device 600 are respectively performed in order to implement the corresponding processes of the network device in the method 200 as shown in FIG. 4, and will not be repeated herein for brevity.

Figure 18:
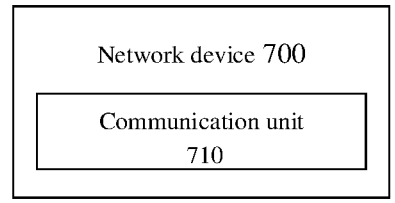
FIG. 18 is a schematic block diagram of another network device provided according to an implementation of the present application.

FIG. 18 is a schematic block diagram of a network device 700 according to an implementation of the present application. As shown in FIG. 18, the network device 700 includes a communication unit 710.

The communication unit 710 is configured to receive a first message in a random access procedure sent by a terminal device, and the first message includes a random access preamble.

The communication unit 710 is further configured to send a first RAR for the first message by using a first RAR format or a second RAR format according to a type of an uplink carrier receiving the first message, and the first RAR format is different from the second RAR format.

Optionally, the uplink carrier is an uplink unlicensed carrier or an uplink licensed carrier, and the communication unit 710 is specifically configured to: send the first RAR by using the first RAR format if the network device receives the first message sent by the terminal device on an uplink unlicensed carrier; and/or send the first RAR by using the second RAR format if the network device receives the first message sent by the terminal device on an uplink licensed carrier.

Optionally, the first RAR format includes first information for an unlicensed carrier, and the second RAR format does not include the first information.

Optionally, the first information includes at least one piece of the following information: an LBT category used for indicating a channel access level or mechanism; and frame information used for indicating SFN information in which a PRACH is located.

Optionally, part or all of information included in the first information is identified or indicated by a bitmap.

Optionally, the LBT category occupies one of the following bit resources: 1 bit, 2 bits, 3 bits, 4 bits, or 8 bits.

Optionally, the frame information occupies one of the following bit resources: 1 bit, 2 bits, 3 bits, 4 bits, 8 bits, 14 bits, or 16 bits.

Optionally, a bit resource occupied by the frame information is related to a size of a RAR window used for detecting the first RAR.

Optionally, the communication unit 710 is specifically configured to: send the first RAR by using the first RAR format or the second RAR format on a downlink licensed carrier or a downlink unlicensed carrier according to a type of an uplink carrier receiving the first message.

Optionally, the communication unit 710 is specifically configured to: send the first RAR by using the first RAR format on a downlink unlicensed carrier if the network device 700 receives the first message on an uplink unlicensed carrier; and/or send the first RAR by using the second RAR format on a downlink unlicensed carrier if the network device 700 receives the first message on an uplink licensed carrier.

Optionally, the communication unit 710 is specifically configured to: send the first RAR by using the first RAR format on a downlink licensed carrier if the network device 700 receives the first message on an uplink unlicensed carrier; and/or send the first RAR by using the second RAR format on a downlink licensed carrier if the network device 700 receives the first message on an uplink licensed carrier; and/or send the first RAR by using the first RAR format on a downlink unlicensed carrier if the network device 700 receives the first message on an uplink licensed carrier.

It should be understood that the network device 700 according to an implementation of the present application may correspond to the network device in the method implementation of the present application, and the above and other operations and/or functions of various units in the network device 700 are respectively performed in order to implement the corresponding processes of the network device in the method 300 as shown in FIG. 14, and will not be repeated herein for brevity.

Figure 19:
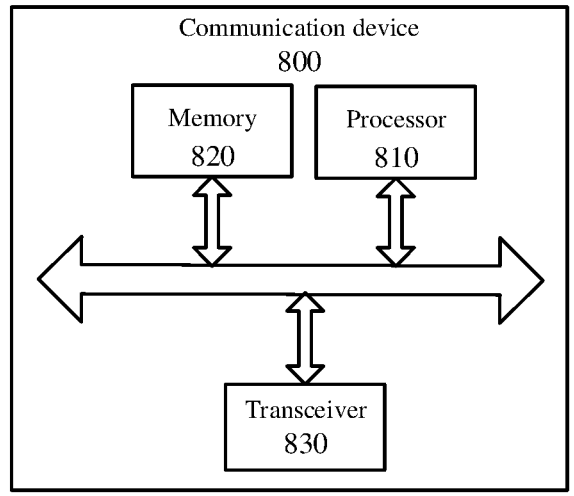
FIG. 19 is a schematic block diagram of a communication device provided according to an implementation of the present application.

FIG. 19 is a schematic structural diagram of a communication device 800 provided in an implementation of the present application. The communication device 800 shown in FIG. 19 includes a processor 810, which may invoke and run a computer program from a memory to implement the methods in the implementations of the present application.

Optionally, as shown in FIG. 19, the communication device 800 may further include the memory 820. The processor 810 may invoke and run a computer program from the memory 820 to implement the methods in the implementations of the present application.

The memory 820 may be a separate device independent of the processor 810 or may be integrated in the processor 810.

Optionally, as shown in FIG. 19, the communication device 800 may further include a transceiver 830. The processor 810 may control the transceiver 830 to communicate with other devices, specifically, to send information or data to other devices or receive information or data sent by other devices.

The transceiver 830 may include a transmitter and a receiver. The transceiver 830 may further include antennas, the number of which may be one or more.

Optionally, the communication device 800 may be specifically the network device or base station of the implementations of the present application, and the communication device 800 may implement the corresponding processes implemented by the network device or base station in various methods of the implementations of the present application, which will not be described repeatedly herein for brevity.

Optionally, the communication device 800 may be specifically the mobile terminal/terminal device of the implementations of the present application, and the communication device 800 may implement the corresponding processes implemented by the mobile terminal/terminal device in various methods of the implementations of the present application, which will not be described repeatedly herein for brevity.

Figure 20:
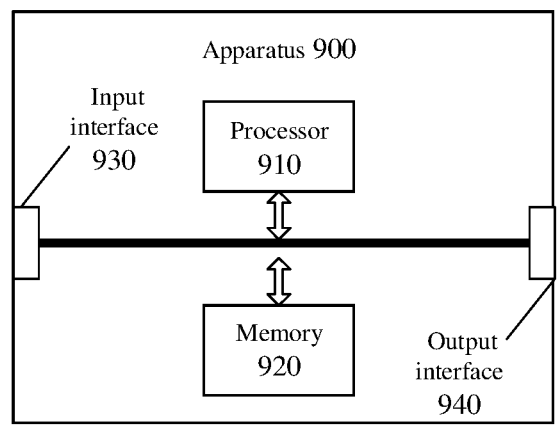
FIG. 20 is a schematic block diagram of an apparatus provided according to an implementation of the present application.

FIG. 20 is a schematic structural diagram of an apparatus of an implementation of the present application. The apparatus 910 shown in FIG. 20 includes a processor 910, which may invoke and run a computer program from a memory to implement the methods in the implementations of the present application.

Optionally, as shown in FIG. 20, the apparatus 900 may further include a memory 920. The processor 910 may invoke and run a computer program from the memory 920 to implement the methods in the implementations of the present application.

The memory 920 may be a separate device independent of the processor 910 or may be integrated in the processor 910.

Optionally, the apparatus 900 may further include an input interface 930. The processor 910 may control the input interface 930 to communicate with other devices or chips, specifically, to acquire information or data sent by other devices or chips.

Optionally, the apparatus 900 may further include an output interface 940. The processor 910 may control the output interface 940 to communicate with other devices or chips, specifically, to output information or data to other devices or chips.

Optionally, the apparatus may be applied to the network device or base station of the implementations of the present application, and the apparatus may implement the corresponding processes implemented by the network device or base station in various methods of the implementations of the present application, which will not be described repeatedly herein for brevity.

Optionally, the apparatus may be applied to the mobile terminal/terminal device in the implementations of the present application, and the apparatus may implement the corresponding processes implemented by the mobile terminal/terminal device in various methods of the implementations of the present application, which will not be described repeatedly herein for brevity.

Optionally, the apparatus mentioned in the implementations of the present application may be a chip, for example, it may be a system-level chip, a system chip, a chip system, or a system-on-chip, etc.

Figure 21:
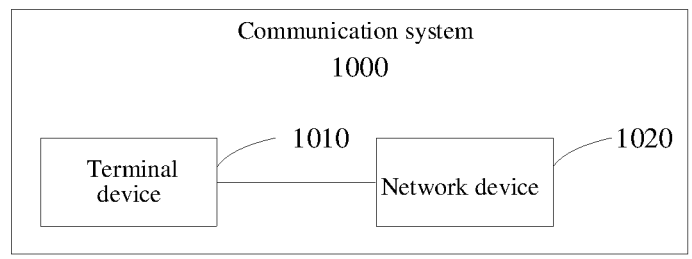
FIG. 21 is a schematic block diagram of a communication system provided according to an implementation of the present application.

FIG. 21 is a schematic block diagram of a communication system 1000 provided in an implementation of the present application. As shown in FIG. 21, the communication system 1000 includes a terminal device 1010 and a network device 1020.

The terminal device 1010 may be configured to implement the corresponding functions implemented by the terminal device in the methods described above, and the network device 1020 may be configured to implement the corresponding functions implemented by the network device or base station in the methods described above, which will not be described repeatedly herein for brevity.

It should be understood that the processor of the implementations of the present application may be an integrated circuit chip having a signal processing capability. In an implementation process, each of the steps of the foregoing method implementations may be implemented through an integrated logic circuit of hardware in a processor or instructions in a form of software. The processor described above may be a general purpose processor, a Digital Signal Processor (DSP), an Application Specific Integrated Circuit (ASIC), a Field Programmable Gate Array (FPGA), or another programmable logic device, a discrete gate or a transistor logic device, or a discrete hardware component. The processor may implement or perform various methods, steps, and logical block diagrams disclosed in the implementations of the present application. The general purpose processor may be a microprocessor, or the processor may be any conventional processor, or the like. The steps of the methods disclosed in the implementations of the present application may be directly embodied to be performed by a hardware decoding processor, or may be performed by a combination of hardware and software modules in a decoding processor. The software modules may be located in a storage medium which is mature in the art, such as a random access memory, a flash memory, a read-only memory, a programmable read-only memory, an electrically erasable programmable memory, a register. The storage medium is located in a memory, and a processor reads information in the memory and completes the steps of the foregoing methods in combination with its hardware.

It may be understood that the memory in the implementations of the present application may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM), or a flash memory. A volatile memory may be a Random Access Memory (RAM), which is used as an external cache. Through exemplary but non-restrictive description, many forms of RAM may be available, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM), and a Direct Rambus RAM (DR RAM). It should be noted that the memory in the systems and methods described herein is intended to include, but not be limited to, these and any other suitable types of memories.

It should be understood that the foregoing memory is described in an exemplary but non-restrictive sense. For example, the memory in the implementations of the present application may be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch link DRAM (SLDRAM), a Direct Rambus RAM (DR RAM), or the like. That is, the memory in the implementations of the present application is intended to include, but not be limited to, these and any other suitable types of memories.

An implementation of the present application further provides a computer readable storage medium configured to store a computer program.

Optionally, the computer readable storage medium may be applied to the network device or base station in the implementations of the present application, and the computer program enables the computer to perform the corresponding processes implemented by the network device or base station in various methods of the implementations of the present application, which will not be repeated herein for brevity.

Optionally, the computer readable storage medium may be applied to the mobile terminal/terminal device in the implementations of the present application, and the computer program enables the computer to perform the corresponding processes implemented by the mobile terminal/terminal device in various methods of the implementations of the present application, which will not be repeated herein for brevity.

An implementation of the present application further provides a computer program product including computer program instructions.

Optionally, the computer program product may be applied to the network device or base station in the implementations of the present application, and the computer program instructions enable the computer to perform the corresponding processes implemented by the network device or base station in various methods of the implementations of the present application, which will not be repeated herein for brevity.

Optionally, the computer program product may be applied to the mobile terminal/terminal device in the implementations of the present application, and the computer program instructions enable the computer to perform the corresponding processes implemented by the mobile terminal/terminal device in various methods of the implementations of the present application, which will not be repeated herein for brevity.

An implementation of the present application further provides a computer program.

Optionally, the computer program may be applied to the network device or base station in the implementations of the present application. The computer program, when running on a computer, enables the computer to perform the corresponding processes implemented by the network device or base station in various methods of the implementations of the present application, which will not be repeated herein for brevity.

Optionally, the computer program may be applied to the mobile terminal/terminal device in the implementations of the present application. The computer program, when running on a computer, enables the computer to perform the corresponding processes implemented by the mobile terminal/terminal device in various methods of the implementations of the present application, which will not be repeated herein for brevity.

A person of ordinary skill in the art may recognize that units and algorithm steps in various examples described in combination with the implementations disclosed herein can be implemented in electronic hardware, or a combination of computer software and electronic hardware. Whether these functions are implemented in hardware or software depends on specific applications and design constraints of a technical scheme. Skilled artisans may use different methods to implement the described functions for each particular application, but such an implementation should not be considered to be beyond the scope of the present application.

Those skilled in the art may clearly understand that for the sake of convenience and conciseness of description, specific working processes of the systems, apparatuses and units described above may be referred to the corresponding processes in the above method implementations and will not be repeated herein.

In several implementations provided by the present application, it should be understood that the disclosed systems, apparatuses and methods may be implemented in other ways. For example, the apparatus implementations described above are only illustrative, for example, a division of the units is only a logical function division, and there may be another division manner in actual implementation. For example, multiple units or components may be combined or integrated into another system, or some features may be ignored or not executed. In addition, the shown or discussed coupling or direct coupling or communication connection between each other may be an indirect coupling or communication connection through some interfaces, apparatuses, or units, or may be in electrical, mechanical, or other forms.

The unit described as a separate component may or may not be physically separated, and the component shown as a unit may or may not be a physical unit, i.e., it may be located in one place or may be distributed to multiple network units. Part or all of the units may be selected according to actual needs to achieve purposes of the implementations.

In addition, various functional units in various implementations of the present application may be integrated into one processing unit, or various units may exist physically separately, or two or more than two units may be integrated into one unit.

The function, if implemented in a form of a software functional unit and sold or used as an independent product, may be stored in a computer-readable storage medium. Based on such understanding, a technical scheme of the present application, in essence, or a part contributing to the prior art, or a part of the technical scheme, may be embodied in a form of a software product, the computer software product is stored in a storage medium and includes several instructions for causing a computer device (which may be a personal computer, a server, or a network device, etc.) to perform all or part of the steps of the methods in the implementations. The aforementioned storage medium includes various medium, such as a U disk, a mobile hard disk, a Read-Only Memory (ROM), a Random Access Memory (RAM), a magnetic disk, or an optical disk, which are capable of storing program codes.

What are described above are merely specific implementations of the present application, however the protection scope of the present application is not limited thereto. Any variation or substitution that may easily occur to a person skilled in the art within the technical scope disclosed by the present application shall be included within the protection scope of the present application. Therefore, the protection scope of the present application shall be subject to protection scope of claims.

What is claimed is:

1. A method for wireless communication, comprising:
sending, by a terminal device, a first message in a random access procedure to a network device, wherein the first message comprises a random access preamble; and
detecting, by the terminal device, a first Random Access Response (RAR) for the first message by using a first RAR format or a second RAR format according to a type of an uplink carrier sending the first message, wherein the first RAR format is different from the second RAR format; wherein the uplink carrier is an uplink unlicensed carrier or an uplink licensed carrier, and detecting, by the terminal device, the first RAR for the first message by using the first RAR format or the second RAR format according to the type of the uplink carrier sending the first message comprises:
detecting, by the terminal device, the first RAR by using the first RAR format if the terminal device sends the first message to the network device on the uplink unlicensed carrier; and/or
detecting, by the terminal device, the first RAR by using the second RAR format if the terminal device sends the first message to the network device on the uplink licensed carrier; wherein the first RAR format comprises first information for an unlicensed carrier, and the second RAR format does not comprise the first information; wherein the first information comprises the following information: a Listen Before Talk (LBT) category, used for indicating a channel access mechanism.

2. The method of claim 1, wherein part or all of information comprised in the first information is identified or indicated by a bitmap.

3. A method of wireless communication, comprising:
receiving, by a network device, a first message in a random access procedure sent by a terminal device, wherein the first message comprises a random access preamble; and
sending, by the network device, a first Random Access Response (RAR) for the first message by using a first RAR format or a second RAR format according to a type of an uplink carrier receiving the first message, wherein the first RAR format is different from the second RAR format; wherein the uplink carrier is an uplink unlicensed carrier or an uplink licensed carrier, and sending, by the network device, the first RAR for the first message by using the first RAR format or the second RAR format according to the type of the uplink carrier receiving the first message comprises:
sending, by the network device, the first RAR by using the first RAR format if the network device receives the first message sent by the terminal device on the uplink unlicensed carrier; and/or
sending, by the network device, the first RAR by using the second RAR format if the network device receives the first message sent by the terminal device on the uplink licensed carrier; wherein the first RAR format comprises first information for an unlicensed carrier, and the second RAR format does not comprise the first information; wherein the first information comprises the following information: a Listen Before Talk (LBT) category, used for indicating a channel access mechanism.

4. The method of claim 3, wherein part or all of information comprised in the first information is identified or indicated by a bitmap.

5. A terminal device, comprising a memory and a processor, wherein the processor is configured to execute instructions stored in the memory to perform following operation:
   sending a first message in a random access procedure to a network device, wherein the first message comprises a random access preamble; and
   detecting a first Random Access Response (RAR) for the first message by using a first RAR format or a second RAR format according to a type of an uplink carrier sending the first message, wherein the first RAR format is different from the second RAR format; wherein the uplink carrier is an uplink unlicensed carrier or an uplink licensed carrier, and the processor is specifically configured to execute instructions stored in the memory to perform following operation:
   detecting the first RAR by using the first RAR format if the terminal device sends the first message to the network device on the uplink unlicensed carrier; and/or
   detecting the first RAR by using the second RAR format if the terminal device sends the first message to the network device on the uplink licensed carrier; wherein the first RAR format comprises first information for an unlicensed carrier, and the second RAR format does not comprise the first information; wherein the first information comprises the following information: a Listen Before Talk (LBT) category, used for indicating a channel access mechanism.

6. The terminal device of claim 5, wherein part or all of information comprised in the first information is identified or indicated by a bitmap.

7. A network device, comprising a memory and a processor, wherein the processor is configured to execute instructions stored in the memory to perform following operation:
   receiving a first message in a random access procedure sent by a terminal device, wherein the first message comprises a random access preamble; and
   sending a first Random Access Response (RAR) for the first message by using a first RAR format or a second RAR format according to a type of an uplink carrier receiving the first message, wherein the first RAR format is different from the second RAR format; wherein the uplink carrier is an uplink unlicensed carrier or an uplink licensed carrier, and the processor is specifically configured to execute instructions stored in the memory to perform following operation:
   sending the first RAR using the first RAR format if the network device receives the first message sent by the terminal device on the uplink unlicensed carrier; and/or
   sending the first RAR using the second RAR format if the network device receives the first message sent by the terminal device on the uplink licensed carrier; wherein the first RAR format comprises first information for an unlicensed carrier, and the second RAR format does not comprise the first information; wherein the first information comprises the following information: a Listen Before Talk (LBT) category, used for indicating a channel access mechanism.

8. The network device of claim 7, wherein part or all of information comprised in the first information is identified or indicated by a bitmap.

* * * * *